United States Patent
Yan et al.

(10) Patent No.: US 8,949,504 B2
(45) Date of Patent: Feb. 3, 2015

(54) MEMORY DEVICES AND MEMORY CONTROL METHODS WITH ISP CODE

(71) Applicants: Wei-Lun Yan, Tainan (TW); Chun-Yi Lo, New Taipei (TW)

(72) Inventors: Wei-Lun Yan, Tainan (TW); Chun-Yi Lo, New Taipei (TW)

(73) Assignee: Silicon Motion, Inc., Jhubei (TW)

( * ) Notice: Subject to any disclaimer, the term of this patent is extended or adjusted under 35 U.S.C. 154(b) by 255 days.

(21) Appl. No.: 13/621,493

(22) Filed: Sep. 17, 2012

(65) Prior Publication Data
US 2014/0013063 A1    Jan. 9, 2014

(30) Foreign Application Priority Data
Jul. 5, 2012    (TW) .............................. 101124172 A

(51) Int. Cl.
*G06F 12/00*    (2006.01)
(52) U.S. Cl.
USPC ............... 711/5; 711/154; 711/150; 711/165; 711/170; 365/189.03

(58) Field of Classification Search
USPC ......... 711/5, 148, 154, 157, 170; 365/189.01, 365/189.03, 189.04
See application file for complete search history.

(56) References Cited

U.S. PATENT DOCUMENTS 8,175,012 B2 *    5/2012   Chu et al. ....................... 370/278
2005/0160217 A1 *    7/2005   Gonzalez et al. ................. 711/6

* cited by examiner

*Primary Examiner* — John Lane
(74) *Attorney, Agent, or Firm* — Wang Law Firm, Inc.; Li K. Wang; Stephen Hsu

(57) ABSTRACT

A memory device is provided, including a first memory die, a second memory die and a controller. The first memory die has a first system block. The second memory die has a second system block. The controller is coupled to the first and second memory dies through a chip enable lane in order to write the same in-system programming codes (ISP codes) to the first and second system blocks, in which, when the memory device is turned on, the controller reads the ISP code from the first system block or the second system block.

10 Claims, 6 Drawing Sheets

MEMORY DEVICES AND MEMORY CONTROL METHODS WITH ISP CODE

CROSS REFERENCE TO RELATED APPLICATIONS

This Application claims priority of Taiwan Patent Application No. 101124172, filed on Jul. 5, 2012, the entirety of which is incorporated by reference herein.

BACKGROUND OF THE INVENTION

1. Field of the Invention

The present invention relates to computer technology, and in particular relates to access methods.

2. Description of the Related Art

Storage units are widely used in digital cameras, cell phones, personal digital assistants (PDA), global positioning systems (GPS), moving picture experts group 1 layer 3s (MP3) or portable electronic devices having access capabilities and so on. Non-volatile memories (e.g., flash memories) are the most common type of storage units.

However, due to bus conflict, storage units may obtain incorrect in-system programming codes (ISP code) when reading ISP codes. Therefore, there is a need for a memory device and a memory control method thereof to mitigate the above problem.

BRIEF SUMMARY OF THE INVENTION

In light of the previously described problem, the invention provides an embodiment of a memory device, including a first memory die, a second memory die and a controller. The first memory die has a first system block. The second memory die has a second system block. The controller is coupled to the first and second memory dies through a chip enable lane in order to write the same in-system programming codes (ISP codes) to the first and second system blocks, in which, when the memory device is turned on, the controller reads the ISP code from the first system block or the second system block.

The disclosure also provides a memory control method, suitable for a memory device having a controller and first and second memory dies respectively having first and second system blocks. The memory control method includes the steps of: writing the same in-system programming codes (ISP codes) to the first and second system blocks; and reading the ISP code from the first system block or the second system block through a chip enable lane by the controller when the memory device is turned on.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
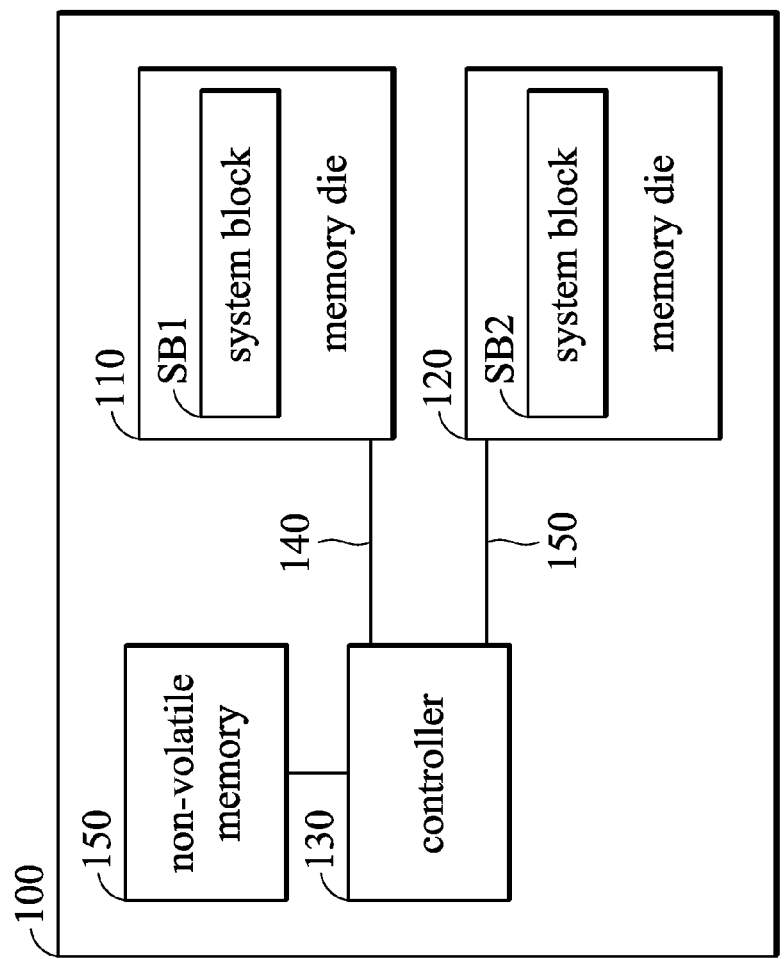
FIG. 1 illustrates a schematic view of a conventional memory device.

FIG. 1 illustrates a schematic view of a conventional memory device. As shown in FIG. 1, the memory device 100 has two chip enable lanes and two memory dies (2CE-2DIE). The controller 130 accesses the system blocks SB1 and SB2 through the chip enable lanes 140 and 150, respectively. Since the memory device 100 has the two chip enable lanes 140 and 150, the controller 130 will not incorrectly read the in-system programming code (ISP code). For example, the controller 130 can not read the ISP code of the system block SB2 when the controller 130 is reading the ISP code of the system block SB1.

The number of chip enable lanes is reduced for design efficiency (e.g., removing one of the chip enable lanes 140 and 150). Therefore, the memory device has only one chip enable lane. When the memory device having a single chip enable lane and two memory dies is powered on (i.e., the memory device is turned on), the memory device operates in a first mode (i.e., non-1CE 2Die mode) first, and then the memory device switches to a second mode (i.e., 10E 2Die mode) according to a predetermined command. The memory device returns to the first mode when the memory device is turned off. Due to the bus conflict, the 10E 2Die memory device can not ensure which one of the memory dies is operating normally when the 10E 2Die memory device reads the ISP code of the memory dies (flash memories) in the first mode. For example, the received data may transmitted from the die Die0 (e.g., the memory die 210) or the die Die1 (e.g., the memory die 220), thus, the received data may not be correct.

Figure 2:
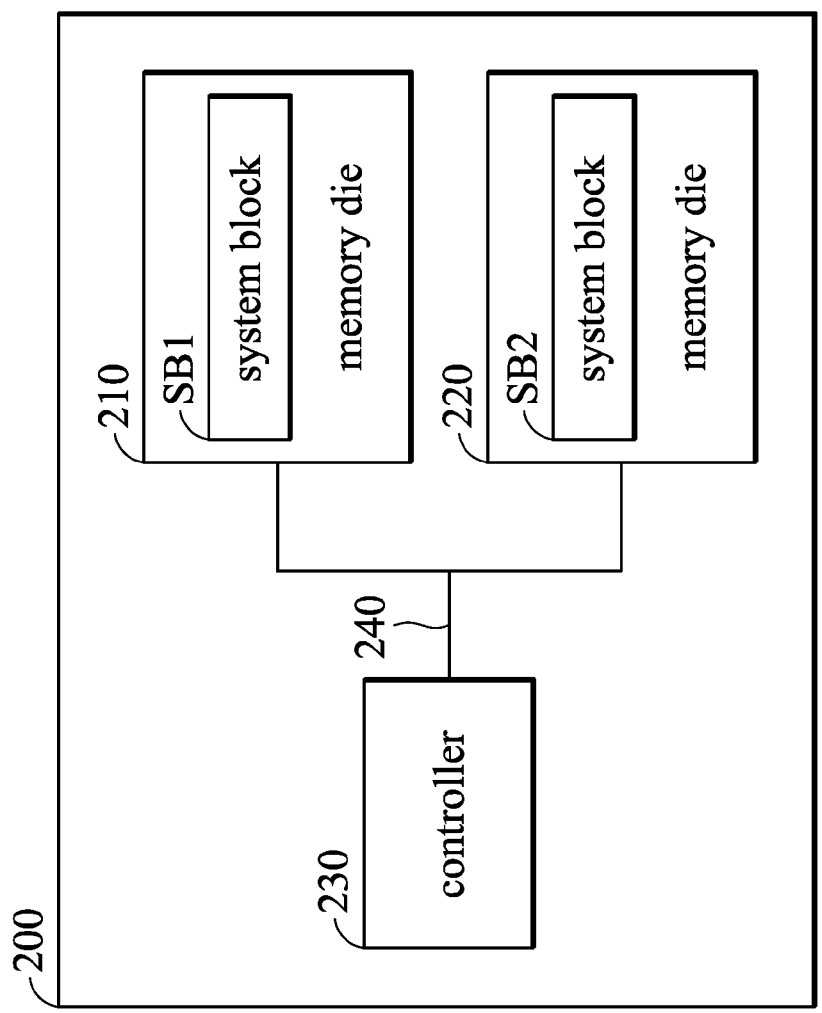
FIG. 2 illustrates a schematic view of a memory device of the disclosure.

FIG. 2 illustrates a schematic view of a memory device of the disclosure. The memory device 200 is similar to the memory device 100. The difference is that the memory device 200 has a single chip enable lane and two memory dies. As shown in FIG. 2, the memory device 200 includes memory dies 210 and 220 and a controller 230. In detail, the memory die 210 includes a system block SB1, and the memory die 220 includes a system block SB2. When the memory device 200 is turned on, the controller 230 reads the ISP code from the system block SB1 or the system block SB2 through the chip enable lane 240. Since the same ISP codes are written to the system blocks SB1 and SB2, the data transmitted from the system blocks SB1 and SB2 is the same. Therefore, the controller 230 can correctly read the ISP code no matter which system block the received ISP code is transmitted from.

Figure 3:
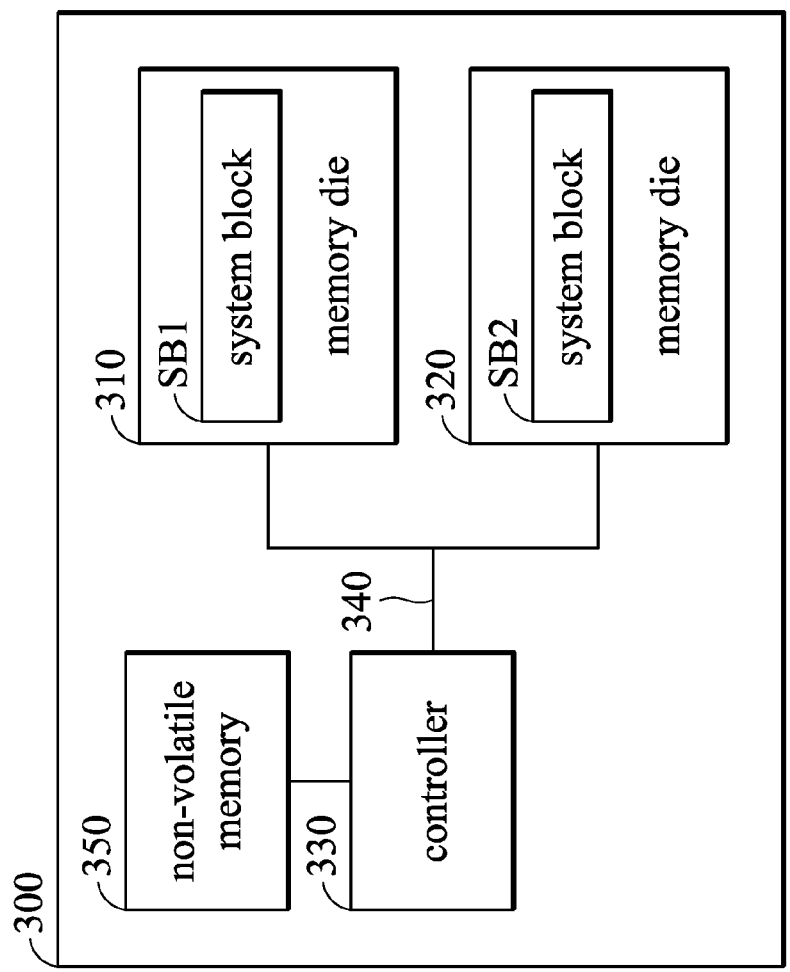
FIG. 3 illustrates another schematic view of a memory device of the disclosure.

FIG. 3 illustrates another schematic view of a memory device of the disclosure, in which the memory device 300 has a single chip enable lane and two memory dies. As shown in FIG. 3, the memory device 300 is similar to the memory device 200. The difference is that the memory device 300 has a non-volatile memory 350 coupled to the controller 330. The non-volatile memory 350 can be a read-only memory (ROM), and has a ROM code.

When the memory device 300 is turned on, the memory device 300 operates in the first mode (non-1CE 2Die mode).

When the controller 300 has obtained the ISP code, the memory device 300 switches to the second mode (1-CE 2Die mode) from the first mode. When the memory device 300 operates in the second mode, the controller 330 accesses data according to the ISP code and the ROM code. When the memory device 300 is restarted, the memory device 300 returns to the first mode.

Figure 4:
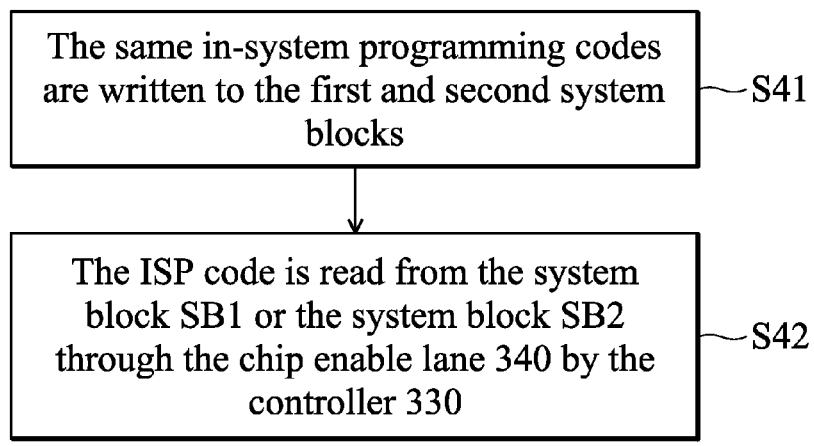
FIG. 4 illustrates a flowchart of a memory control method of the disclosure.

FIG. 4 illustrates a flowchart of a memory control method of the disclosure. As shown in FIG. 4 the memory control method includes the following steps.

In step S41, the same in-system programming codes are written to the first and second system blocks. When the memory device 300 is turned on, step S42 is performed, and the ISP code is read from the system block SB1 or the system block SB2 through the chip enable lane 340 by the controller 330, in which the memory device 300 operates in the first mode when the memory device 300 has been turned on.

Figure 5:
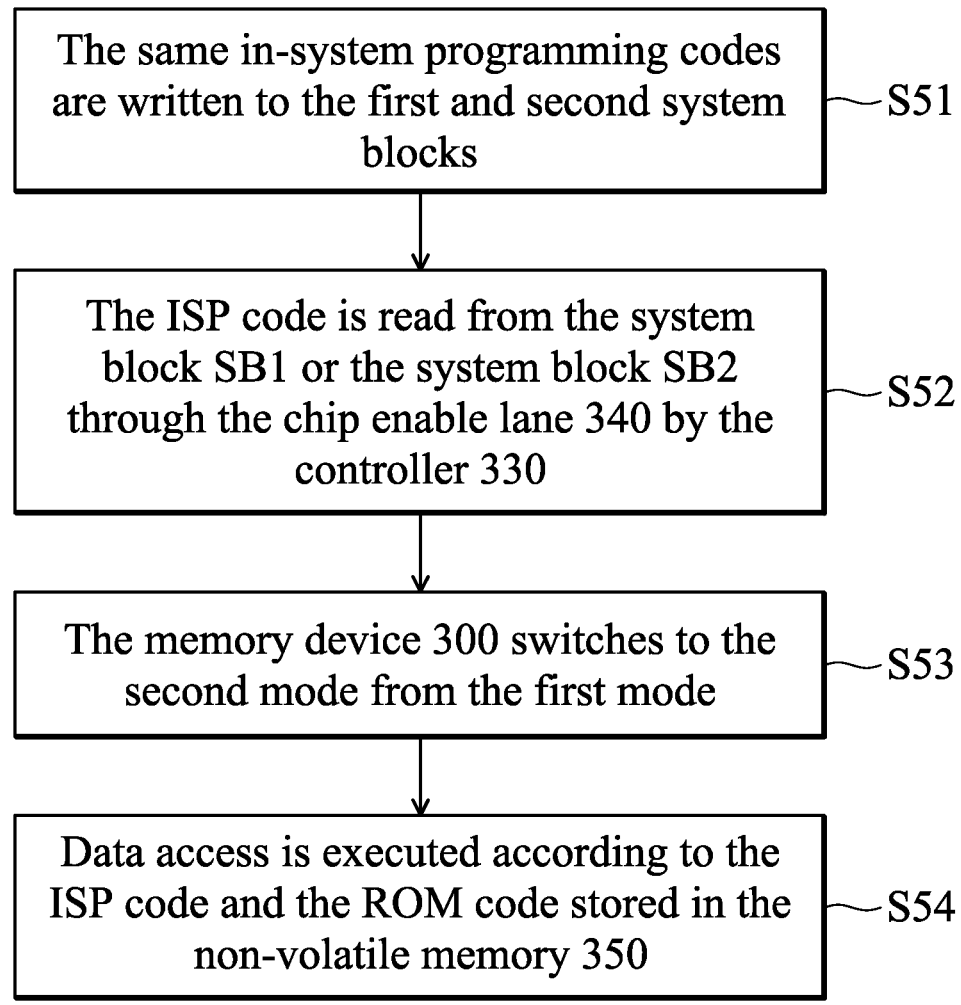
FIG. 5 illustrates another flowchart of a memory control method of the disclosure.

FIG. 5 illustrates another flowchart of a memory control method of the disclosure, in which steps S51~S52 are the same as steps S41~S42. As shown in FIG. 5, when the controller 330 has obtained the ISP code, step S53 is performed, and the memory device 300 switches to the second mode from the first mode. When the memory device 300 operates in the second mode, step S54 is performed, and data access is executed according to the ISP code and the ROM code stored in the non-volatile memory 350, in which the non-volatile memory 350 is disposed in the memory device 300. When the memory device 300 is restarted, step S52 is performed.

Figure 6:
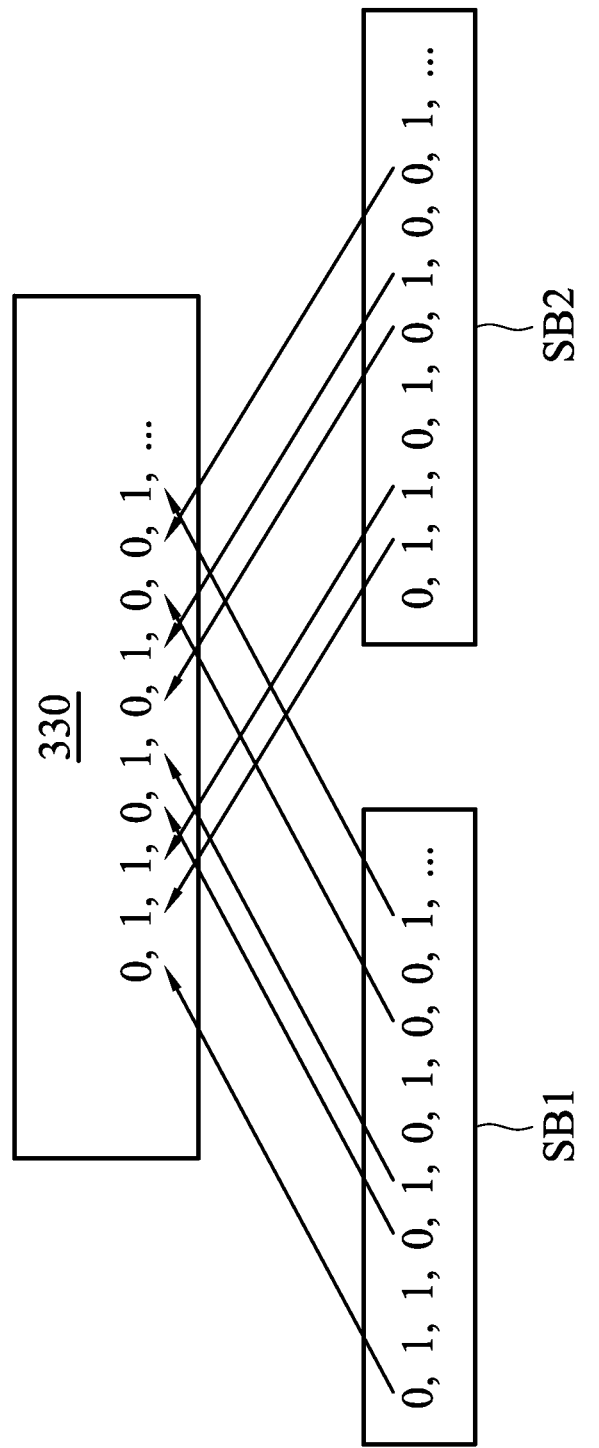
FIG. 6 illustrates a schematic view of the ISP code access of the disclosure.

FIG. 6 illustrates a schematic view of the ISP code access of the disclosure. As shown in FIG. 6, the system blocks SB1 and SB2 are written to the same ISP codes, thus, the ISP code transmitted from the system blocks SB1 and SB2 are the same when the controller 330 reads the ISP code from the system block SB1 or SB2. Therefore, the controller 330 can correctly read the ISP code no matter which system block the received ISP code is transmitted from.

When the memory devices 200 and 300 read data from the system blocks in the first mode, the source of the data could be Die0 (e.g., the memory device 210) or Die1 (e.g., the memory device 220) due to bus conflict. The same data (i.e., the ISP code) are written to the Die0 (e.g., the memory device 210) and the Die1 (e.g. the memory device 220), and the controller can ensure that the received data is correct when the controller accesses the data from the system blocks.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A memory device, comprising
   a first memory die, having a first system block;
   a second memory die, having a second system block; and
   a controller, coupled to the first and second memory dies through a chip enable lane in order to write the same in-system programming codes (ISP codes) to the first and second system blocks, wherein, when the memory device is turned on, the controller reads the ISP code from the first system block or the second system block.

2. The memory device as claimed in claim 1, wherein, when the memory device has been turned on, the memory device operates in a first mode.

3. The memory device as claimed in claim 2, wherein, when the controller has obtained the ISP code, the memory device switches to a second mode from the first mode.

4. The memory device as claimed in claim 3, further comprising:
   a non-volatile memory, coupled to the controller, and having a read-only memory (ROM) code, wherein, when the memory device operates in the second mode, the controller executes data access according to the ISP code and the ROM code.

5. The memory device as claimed in claim 3, wherein the memory device operates in the first mode when the memory device has been restarted.

6. A memory control method, suitable for a memory device having a controller and first and second memory dies respectively having first and second system blocks, comprising
   writing the same in-system programming codes (ISP codes) to the first and second system blocks; and
   reading the ISP code from the first system block or the second system block through a chip enable lane by the controller when the memory device is turned on.

7. The memory control method as claimed in claim 6, wherein, when the memory device is turned on, the memory device operates in a first mode.

8. The memory control method as claimed in claim 7, comprising:
   switching the memory device from the first mode to a second mode when the controller has obtained the ISP code.

9. The memory control method as claimed in claim 8, further comprising:
   executing data access according to the ISP code and a read-only memory (ROM) code stored in a non-volatile memory when the memory device operates in the second mode, wherein the non-volatile memory is disposed in the memory device.

10. The memory control method as claimed in claim 8, wherein the memory device operates in the first mode when the memory device has been restarted.

* * * * *